United States Patent [19]

Kogure

[11] Patent Number: 5,383,506

[45] Date of Patent: Jan. 24, 1995

[54] PNEUMATIC TIRE HAVING REDUCED NOISE

[75] Inventor: Tomohiko Kogure, Kanagawa, Japan

[73] Assignee: The Yokohama Rubber Co., Ltd., Tokyo, Japan

[21] Appl. No.: 929,054

[22] Filed: Aug. 13, 1992

Related U.S. Application Data

[63] Continuation-in-part of Ser. No. 350,175, May 8, 1989, abandoned.

[30] Foreign Application Priority Data

May 11, 1988 [JP] Japan .................. 63-112545

[51] Int. Cl.⁶ .............................................. B60C 11/03
[52] U.S. Cl. ................................................. 152/209 R
[58] Field of Search .......... 152/209 R, 209 A, 209 D, 152/DIG. 3

[56] References Cited

U.S. PATENT DOCUMENTS

| | | | |
|---|---|---|---|
| 2,808,867 | 10/1957 | Buddenhagen et al. | 152/209 R |
| 2,878,852 | 3/1959 | Lippmann et al. | 152/209 R |
| 4,474,223 | 10/1984 | Landers | 152/209 R |
| 4,503,898 | 3/1985 | Hitzky | 152/209 R |
| 4,721,141 | 1/1988 | Collette et al. | 152/209 R |
| 4,777,993 | 10/1988 | Yamashita et al. | 152/209 A |

FOREIGN PATENT DOCUMENTS

| | | | |
|---|---|---|---|
| 3630590 | 3/1988 | Germany | 152/209 R |
| 285407 | 11/1989 | Japan | 152/209 R |

*Primary Examiner*—Geoffrey L. Knable
*Attorney, Agent, or Firm*—Nikaido Marmelstein Murray & Oram

[57] ABSTRACT

A pneumatic tire having a tread surface comprised of a plurality of pitches of different lengths arranged to extend around the circumference of the tire and which includes a pitch of the shortest pitch length $P_{min}$ and a pitch of the longest pitch length $P_{max}$, a period of the pitches begins with a pitch of $P_{min}$ and contains at least one pitch of $P_{max}$ between the pitch of $P_{min}$ and a pitch of $P_{min}$ in a next period, a fundamental period begins with the pitch of $P_{min}$ and ends with a pitch located immediately before the pitch of $P_{min}$ located first in the next period. In a pitch arangement within the fundamental period, the proportion of components of each higher order in the range of a second order to a fourth order relative to the first-order component is 80 to 200% when Fourier expansion of a stepped waveform comprising the reciprocal of the pitch length and the pitch length is conducted. The number of the fundamental periods is 1 to 4. The length of the pitch arrangement is 60% or more of the total circumferential length of the tire. The length of each fundamental period is at least 1/7 of the total circumferential length of the tire.

6 Claims, 6 Drawing Sheets

$\beta = 1.0$ $\beta = 1.4$

β = 2.0

$\theta_2 = 1.0$  β = 1.0

PNEUMATIC TIRE HAVING REDUCED NOISE

This application is a continuation-in-part application of application Ser. No. 07/350,175, filed May 8, 1989, now abandoned.

BACKGROUND OF THE INVENTION

The present invention relates to a pneumatic tire with a plurality of tread design elements different from each other in the pitch length and arranged on the tread surface which enables a reduction in the noise (pattern noise) caused by the tread design element accompanying rolling of the tire.

In order to reduce the pattern noise, a proposal has been made in the art on dispersion of the pattern noise in a wide frequency range (a frequency dependent upon the product of the number of revolutions of the tire and that of tread design elements) around the pitch frequency to make the noise inconspicuous. This method is called a variable pitch arrangement. In this method, several kinds of tread design elements (i.e., pitches) different from each other in the pitch length are properly provided in the circumferential direction of the tire so that the time intervals of a pulsatory noise or vibration caused when each tread design element is brought into contact with the ground surface is changed, thereby preventing the noise from concentrating on a particular frequency.

This method is based on frequency modulation theory employed in, for example, radio engineering. However, in this method, no sufficient reduction in the pattern noise can be attained.

The present inventors have made studies with a view to reducing the pattern noise and, as a result, have found that the pulsation of the sound pressure level must not be overlooked as a factor which worsens the impression of the tire noise. Specifically, when the conventional sound level measuring method wherein a sound level is expressed in terms of an average value in a given period of time provides the same sound level, the auditory feeling of the human being frequently finds a difference in the sound level. The present inventors have searched for the cause of the above-described phenomenon and, as a result, have found that this phenomenon is attributable to a difference between the sound pressure level which greatly pulsates in a frequency range as low as about 10 Hz or less and the sound pressure level which does not pulsate in such a frequency range. The pulsation of the sound level, i.e., the pulsation which is one of the main causes of the noise, can be determined by outputting the change in the sound pressure level with time through reproduction at a low speed of the noise recorded at a high speed. For example, the pulsation can be determined according to the testing method for tire noise prescribed in JASO C606-73 wherein a tire is rolled at 50 km/hr on a steel drum having a diameter of 3000 mm (pneumatic pressure, rim size, and load: JATMA standard conditions) to evaluate the pulsation in terms of the degree of variation of OA value (overall value of the noise which has passed through a band-pass filter of 100 to 2000 Hz) caused when the tire makes one turn.

In the theory of the conventional tread design element arrangement with respect to the sound pressure level, it is a common practice to simulate the dispersion on a frequency axis through Fourier expansion of a sine wave train generated at the same time intervals as the order of arrangement of the tread design elements in one turn of the tire, assuming that one sine wave is generated from one tread design element. In particular, various studies and proposals have been made on a theoretical analysis in such an arrangement that the elements having the differing pitches are successively arranged from a short pitch to a long pitch and again to a short pitch, thereby changing the pitch length in a sine wave form (see, e.g., Jidosha Gijutsu, Vol. 28, No. 1, 1974 "Taiya Noizu ni Tsuite", and Japanese Patent Laid-Open No 115801/1979). In these observations, no discussion is made on the pulsation of the above-described sound pressure level because the observation is made assuming that the amplitude of the vibration generated from each tread design element is constant.

The present inventors have noted that a large circumferential length of the tread design element gives rise to a large level of a vibration generated from the element and have tried a theoretical calculation under the following assumption. That is, Fourier expansion has been made assuming that the vibration generated from each tread design element is a sine wave wherein the amplitude is increased in proportion to the circumferential length of the tread design element. As a result, it has been found that, as is apparent from FIGS. 10(a) and (b) and FIGS. 11(a) and (b), when assuming that sine waves having an equal amplitude are generated from each tread design element according to the conventional calculation method, no amplitude appears in a low frequency range as shown in FIG. 10(b), while when assuming that there occurs a sine wave having an amplitude corresponding to the pitch length of the tread design element, a vibration peak appears in a low frequency range corresponding to a particular periodicity of the tread design element arrangement as shown in FIG. 11(b). In particular, when the arrangement of the tread design elements is regular, the peak in this low-frequency range becomes significant, which enhances the pulsation of the sound pressure level, so that the impression of the noise is worsened.

FIG. 10(a) and 11(a) are respectively explanatory views of pitch arrangements (tread design element arrangements). Numeral 1 designates a vibration wave form. FIG. 10(b) and FIG. 11(b) are each a graph showing the relationship between the order in the Fourier analysis and the amplitude corresponding to that order. In FIG. 10(a) and FIG. 11(a), the length of pitch A is 31.7 mm, that of pitch B is 27.5 mm and that of pitch C is 24.5 mm, and pitch group $E_1$ refers to a sequence of C C C C C C, pitch group $E_2$ of refers to a sequence of B B B B B B B, pitch group $E_3$ refers to a sequence of A A A A A A A, pitch group $E_4$ refers to a sequence of B B B B, pitch group $E_5$ refers to a sequence of C C C C C C, pitch group $E_6$ refers to a sequence of B B B, pitch group $E_7$ refers to a sequence of A A A A A A, pitch group $E_8$ refers to a sequence of B B B B B B B, pitch group $E_9$ refers to a sequence of C C C C C C C C, pitch group $E_{10}$ refers to a sequence of B B B B, pitch group $E_{11}$ refers to a sequence of A A A A A, and pitch group $E_{12}$ refers to a sequence of B B B B. The pitch arrangement shown in FIG. 10(a) is the same as that shown in FIG. 11(a). The term "pitch" used herein is intended to mean the minimum unit of a repeating pattern of constituting a tire tread design comprising a continuous repeating pattern provided in the circumferential direction of the tire. The term "pitch group" is intended to mean a portion wherein a plurality of the identical pitches among the pitches are arranged in sequence. The term "pitch length" is intended to mean the length of the pitch in the circumferential direction of the tire.

SUMMARY OF THE INVENTION

An object of the present invention is to provide a pneumatic tire improved in the habitability and comfort of an automobile through a reduction in the pattern noise in such a manner that in order to reduce the pulsation of a low-frequency noise generated accompanying the regularity of the pitch arrangement, the pitch arrangement is improved to reduce the pulsation of the sound pressure level.

In order to attain the above-described objects, the present invention provides a pneumatic tire wherein a plurality of tread design elements having pitches different from each other in the length constitute the whole circumference of a tread surface and when the pitch length of the shortest pitch and the pitch length of the longest pitch are assumed to be $P_{min}$ and $P_{max}$ respectively, at least one series of elements is provided which defines a fundamental period. Each series begins with the first appearing element having the pitch of $P_{min}$ and contains at least one element having a pitch of $P_{max}$ between said the pitch of $P_{min}$ and the next appearing element having a pitch of $P_{min}$ in the next period. Each fundamental period begins with said pitch of $P_{min}$ and ends with a pitch located immediately before said pitch of $P_{min}$ located first in the next period. Each fundamental period is in a pitch arrangement such that the proportion of the second and higher order components relative to the first order component is 80 to 200% when Fourier expansion of a stepped waveform formed by pitch lengths as abscissas and the reciprocals of the pitch length as ordinates is conducted. The number of the kinds of the pitches within each fundamental period is 3 to 8. The ratio of the length of different tread design elements within said fundamental period to the length of tread design element adjacent thereto is 1.02 to 1.45. The number of said fundamental periods is 1 to 4. The length of said pitch arrangements of all of the fundamental periods of the tire is 60% or more of the total peripheral length of the tire. The length of each said fundamental period is at least 1/7 of the total peripheral length.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 10(*b*) and FIG. 11(*b*) are each a graph showing the relationship between the order in Fourier analysis and the amplitude corresponding to that order.

DETAILED DESCRIPTION OF THE PREFERRED EMBODIMENTS

Figure 1A:
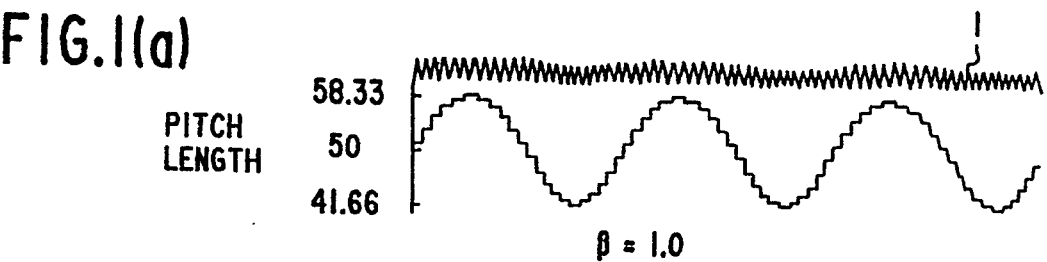
FIGS. 1(*a*) and (*b*), FIGS. 2(*a*) and (*b*), FIGS. 3(*a*) and (*b*), FIGS. 4(*a*) and (*b*), FIGS. 5(*a*) and (*b*), and FIGS. 6(*a*) and (*b*) are each a graph showing the relationship between the pitch arrangement and the order in Fourier analysis and the amplitude corresponding to the order.
Figure 1B:
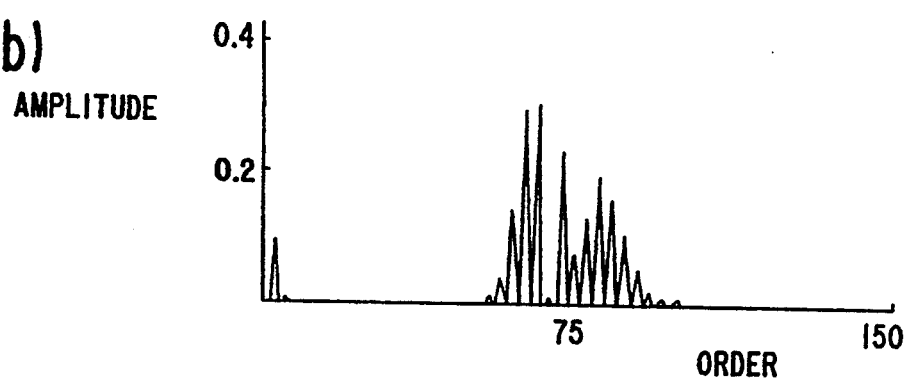
Figure 2A:
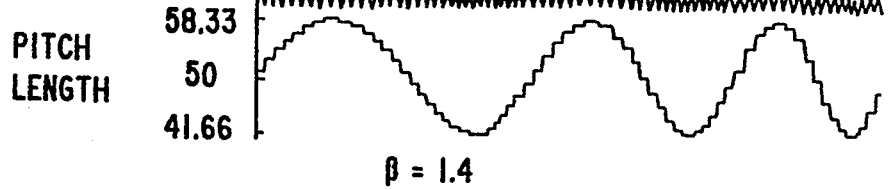
Figure 2B:
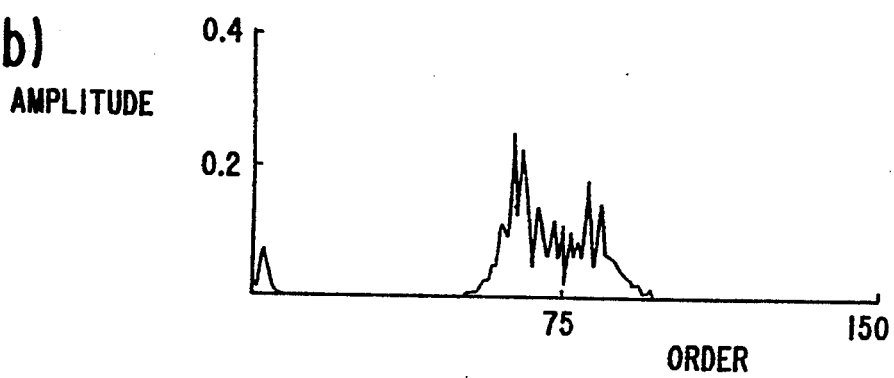
Figure 3A:
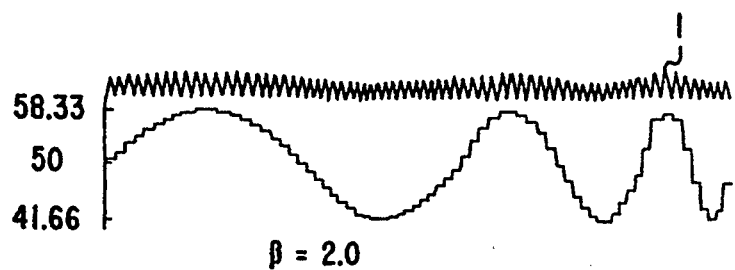
Figure 3B:
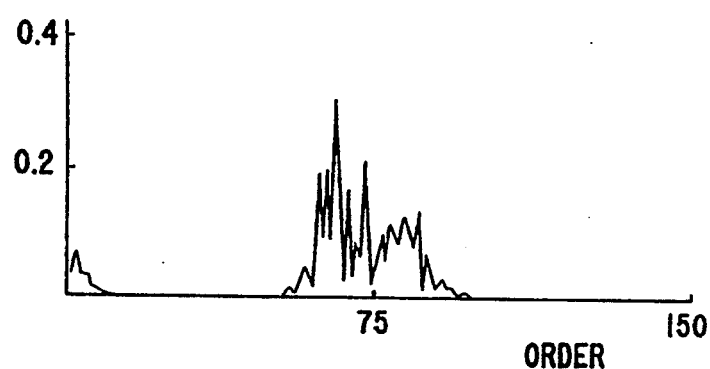

The present inventors have further tried the following theoretical calculation with respect to the above-described pulsation of the pattern noise. More particularly, the present inventors have studied the constitution of the components in the tenth or lower order obtained by the Fourier analysis of a stepped waveform formed from a combination of the reciprocal of a pitch length with a pitch length. It may be easily presumed that, as with the dispersion of the pitch noise in the prior art method, the change in the length of the period would enables the peaks appearing in a low frequency range to be dispersed. Specifically, as shown in FIGS. 1(*a*) and (*b*), in such an arrangement that the pitches are successively arranged from a short pitch to a long pitch and again to a short pitch, thereby changing the pitch length in a sine wave form, since a large vibration occurs from the long pitch and a small vibration occurs from the short pitch, the change in the vibration level coincides with the change in the pitch arrangement in a sine wave form, which causes a large peak to be produced at a low order corresponding to the number of repeating periods, i.e., 3 in this case. Thus it may be easily presumed that, as with the conventional tire where pitches having a plurality of different lengths are arranged for the purpose of dispersing the pitch noise, the adoption of a plurality of different periods would contribute the dispersion of the pulsation. FIGS. 2(*a*) and (*b*) and FIGS. 3(*a*) and (*b*) are the results of a calculation in the case where the length of each period are varied based on this idea. In these drawings $\beta$ represents the ratio of the length of one period to that of the next longest period, for example, the ratio of the length of the longest period to that of the second longest period, and the ratio of the second longest period to that of the third longest period. In FIGS. 1(*a*) and (*b*), $\beta=1$, i.e., the pitches are provided at an equal period. In FIGS. 2(*a*) and (*b*), $\beta=1.4$, and the longest period, the second longest period, and the shortest period account for about ½, about ⅓, and about ¼ of the whole period, respectively. In FIGS. 3(*a*) and (*b*), $\beta=2.0$, and the longest period, the second longest period, and the shortest period account for about ½, about ¼, and about 1/7 of the whole period, respectively.

It can be understood from these results that, as with the dispersion of the pitch noise in the prior art, variation in the length of each pitch causes the peak of a low order to be slightly dispersed. The smaller the number of periods, the better the dispersion of the pitch noise. However, when the number of periods is excessively small, the number of kinds of period length for dispersing the peak of a low order becomes insufficient. For example, when the number of periods is 1, it is impossible to vary the period length by any means.

Figure 4A:
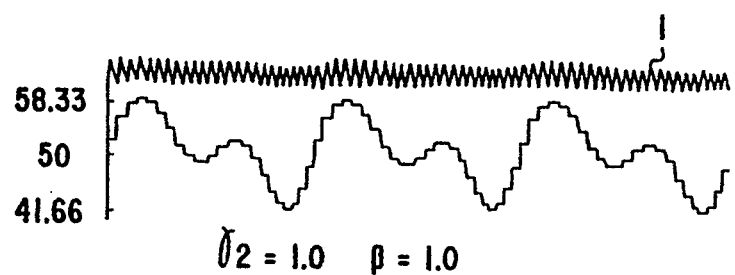
Figure 4B:
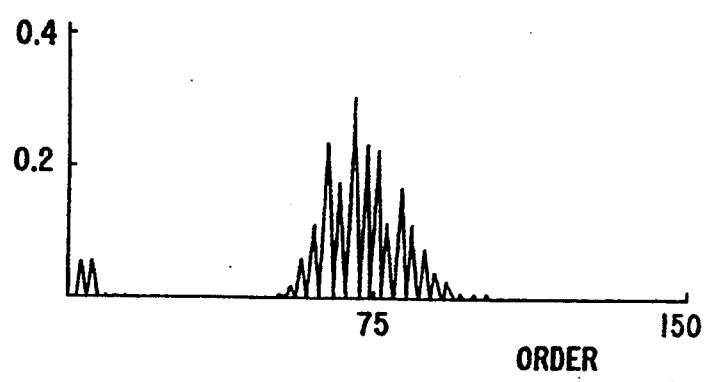

Accordingly, the present inventors have reduced the number of fundamental periods for the purpose of maintaining a good dispersion of the pitch noise and conducted a theoretical calculation with respect to the effect of incorporating periods in a complicate form into one period with a view to improving the dispersion of the peak of a low order. FIGS. 4(*a*) and (*b*) and FIGS.

Figure 5A:
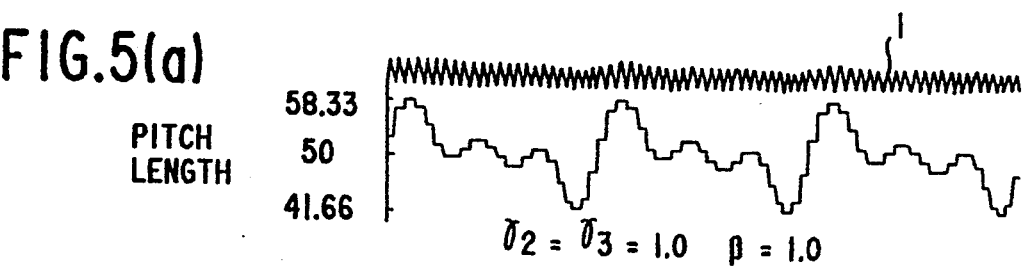
Figure 5B:
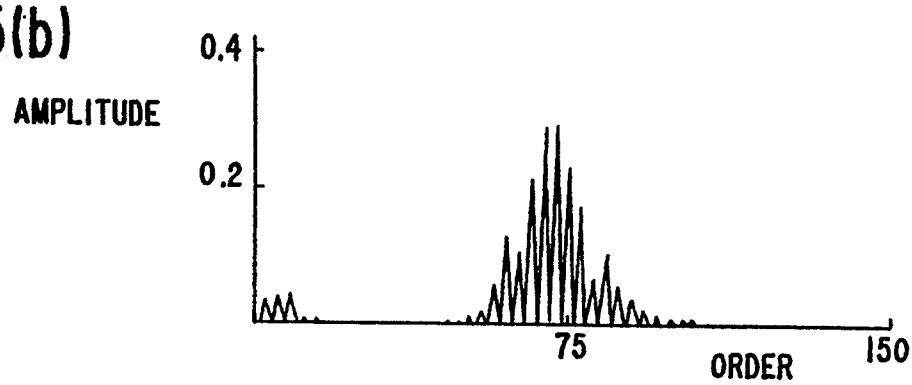
Figure 6A:
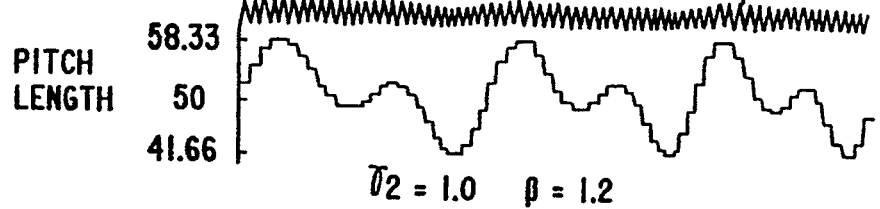
Figure 6B:
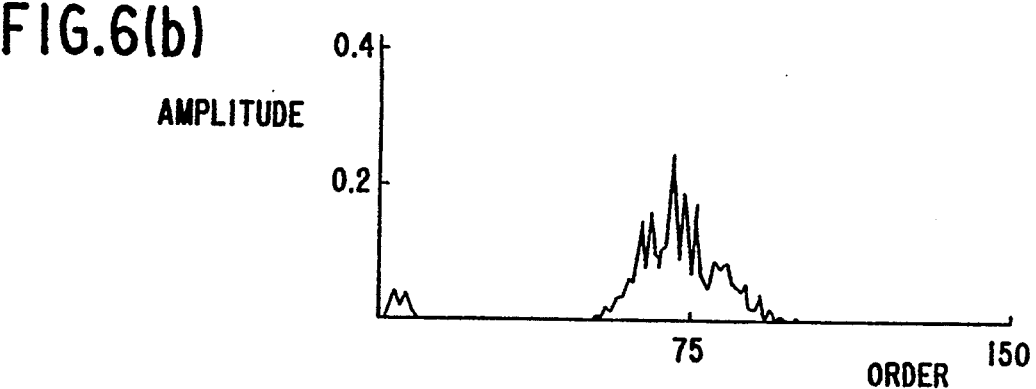

5(a) and (b) are each calculation results in the case where components of orders higher than that of the fundamental period (essentially consisting of a first order component) are added to an arrangement comprising three fundamental periods having an equal length. In the drawings, ri is the abundance of the i-th order component relative to the first order component (fundamental period) assuming the abundance of the first order component to be 1. In FIGS. 4(a) and (b), the $r_2$ is 1.0, i.e., the second order component is added in the same amount as that of the first order component to each fundamental period. In FIGS. 5(a) and (b), both $r_2$ and $r_3$ are 1.0, i.e., the second and third order components are added each in the same amount as that of the first order component to each fundamental period. As is apparent from these drawings, the incorporation of a higher order waveform contributes to a remarkable improvement in the dispersion of pitch noise of a low order even when the length of the fundamental period is equal ($\beta = 1.0$). This can be well understood through a comparison of the above results with those of the above-described results of FIGS. 1(a) and (b) to FIGS. 3(a) and (b). With respect to FIGS. 6(a) and (b), the fundamental period length per se is also varied ($\beta = 1.2$) and at the same time a second order waveform is incorporated in each period. It is apparent from a comparison with FIGS. 4(a) and (b) that a further improvement in the dispersion can be attained in the case of FIGS. 4 (a) and (b).

Based on the above results of studies, in the present invention, the following requirements (1) to (6) have been specified with respect to a pneumatic tire wherein a plurality of design elements having pitches different from each other in the length constitute the whole circumference of a tread surface and when the pitch length of the shortest pitch and the pitch length of the longest pitch are assumed to be $P_{min}$ and $P_{max}$ respectively, at least one series of elements is provided that defines a fundamental period. Each series begins with the first appearing element having a pitch of $P_{min}$ and contains at least one elements having a pitch of $P_{max}$ between said pitch of $P_{min}$ and the next appearing element having the pitch of $P_{min}$ in the next period. Each fundamental period begins with said pitch of $P_{min}$ and ends with a pitch located immediately before said pitch of $P_{min}$ located first in the next period. In this case, each fundamental period contains at least one pitch of $P_{max}$. When the period is free from the pitch of $P_{max}$ and the next pitch of $P_{min}$ comes, this period is further extended to the next period.

(1) Each fundamental period is a pitch arrangement wherein when Fourier expansion of a stepped waveform comprising the pitch lengths as abscissas of the pitch length as ordinates is conducted, the proportion of the second or higher order components relative to the first order component should be 80 to 200% (a ratio of 0.8 to 2.0), preferably 100 to 120% (a ratio of 1.0 to 1.2).

Figure 7:
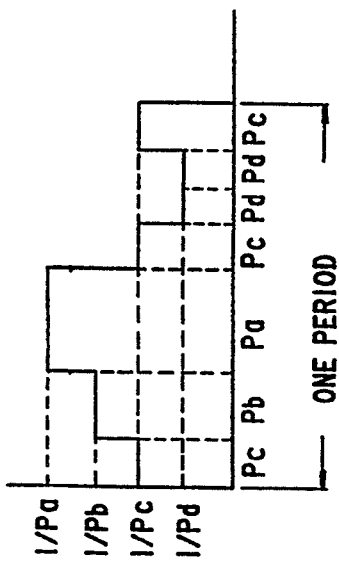
FIG. 7 is an explanatory view of a method of order analysis of the pitch arrangement of one period.

A method of order analysis of the pitch arrangement of one period is shown in FIG. 7, wherein the lengths of elements of one period on the tread surface are plotted as abscissa against the reciprocal of each of the pitch lengths Pc, Pb, Pa, and Pd as ordinate. An arrangement diagram shown in FIG. 7 is prepared according to the arrangement within one period. Then, Fourier expansion is conducted according to a customary method.

In the Fourier series expansion thus conducted, when the second or higher order component is less than 80% of the first order component, no significant effect of dispersion of the pitch noise of a low order can be attained, while when the second or higher order component exceeds 200%, the dispersion of the pitch noise is deteriorated because this case substantially corresponds to one where the fundamental period has a plurality of periods.

(2) The number of the kinds of the design elements within the fundamental period should be 3 to 8, preferably 4 to 6.

When this number is 2 or less, no high order waveform arrangement can be formed within the fundamental period. On the other hand, when the number is 9 or more the manufacturing cost of the mold will be excessively increased.

(3) The ratio of the length of different design elements within said fundamental period to the length of a design element adjacent thereto should be 1.02 to 1.45, preferably 1.04 to 1.30.

In order to form a high order waveform arrangement, a difference in the length between the adjacent design elements tends to be increased. However, when the ratio is less than 1.02, no useful modulation effect can be exhibited. On the other hand, when the ratio exceeds 1.45, the difference in the length between the adjacent element pitches are so large that there occurs an uneven abrasion.

(4) The number of the fundamental periods should be 1 to 4, preferably to 3.

When this number is 5 or more, not only the dispersion of the pitch noise becomes poor but also it becomes impossible to incorporate a sufficiently high order wave arrangement. On the other hand, even if the number of the periods is 1, a good dispersion of a low order noise can be attained when a high order waveform arrangement is incorporated in the fundamental period.

(5) The pitch arrangement of all of the above-described item (1) having 80 to 200% based on the first order component, of the second or higher order component incorporated therein should accounts for 60% or more, preferably 80% or more of the total peripheral length of the tire.

When this projection is less than 60%, no significant effect of dispersion of a low order noise can be attained.

(6) The length of the fundamental period should be at least 1/7, preferably at least 1/6 of the total peripheral length of the tire.

When this value is less than 1/7, the length is so small that no sufficient incorporation of a high order component can be attained.

Further, in the present invention, it is preferred that one fundamental period contain at least one of the second to tenth order components, preferably at least one of the second to fourth order components. A component higher than the tenth order brings about no significant improvement in the dispersion of a low order pitch noise and may sometimes deteriorate the dispersion of the pitch noise.

The present invention will now be described in more detail with reference to the following Example.

EXAMPLE

Steel radial tires having an outer diameter of 667 mm and a tire size of 195/80 R14 (the tire of the present invention, a conventional tire, and a comparative tire) were subjected to evaluation of noise pulsation width (dB) and impression of the noise. The results are shown in Table 1. In Table 1, figures in parentheses refer to the value of period length/total circumferential length and the same value expressed in fraction and figures in braces refer to the orders of the components contained each in the proportion of 0.8 relative to the first-order component.

Evaluation Method of Noise Pulsation Width

The noise pulsation width was determined according to the testing method for tire noise prescribed in JASO C606-73 wherein a tire is rolled at 50 km/hr on a steel drum having a diameter of 3000 mm (pneumatic pressure, rim size, and load: JATMA standard conditions) to evaluate the pulsation in terms of the degree of variation of OA value (overall value of the noise which has passed through a band-pass filter of 100 to 2000 Hz) caused when the tire is made one turn (under a normal running speed of 50 km/hr).

The noise pulsation is readily felt at a lower tire running speed than 50 km/hr. Thus, tires were mounted on a passenger car, and this passenger car was subjected to coasting at an initial running speed of 30 km/hr to determine the noise pulsation by feeling between the time of the initiation of the coasting and the time the passenger car was brought to a halt, under the JATMA standard conditions for the tire inflation pressure and the rim size. For tires to be desirable with respect to the feeling of noise pulsation under conditions of such a low speed running as 30 km/hr, it is required to meet that second- and higher-order components of the pitch arrangement are more than the first-order component, and in addition, that the second-order component to the fourth-order component are altogether within a range of 80 to 200% of components of the first-order so that a concentration of components of a particular order may not take place. Further, if it is made to set the fifth- and higher-order components, too, to be within a range of 80 to 200% of components of the first-order, this may not serve to bring about an effect of improvement.

Figure 8:
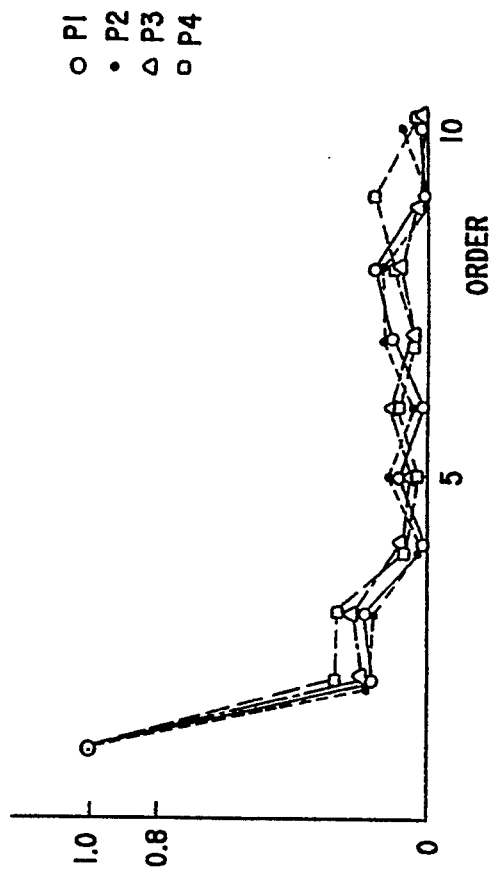
FIG. 8 is a graph showing the relationship between the order of an arrangement within a period with respect to the conventional tire and the ratio of said order to the first order component.

FIG. 8 is a graph showing the relationship between the order of an arrangement within a period of the conventional tire and the proportion of a component of said order relative to the first-order component. In FIG. 8, P1, P2, P3, and P4 each represent a period. In all of the periods P1 to P4, the first-order component is mainly arranged, and the proportion of the second and higher order components is very small. The kinds of tread design element are represented by A, B, C, D, and E, and each length of pitches element is A=40 mm, B=36 mm, C=33 mm, D=29 mm, and E=26 mm.

P1: E E D D C C B B A A B B C C D D
P2: E E E D D D C C C B B B B A A A B B B C C C D D D D
P3: E E D C B B A A B C C D D
P4: E D C C B A B C D

The whole circumference of conventional tire 1: P1+P1+P1+P1.

The whole circumference of conventional tire 2: P2+P1+P3+P4.

Figure 9:
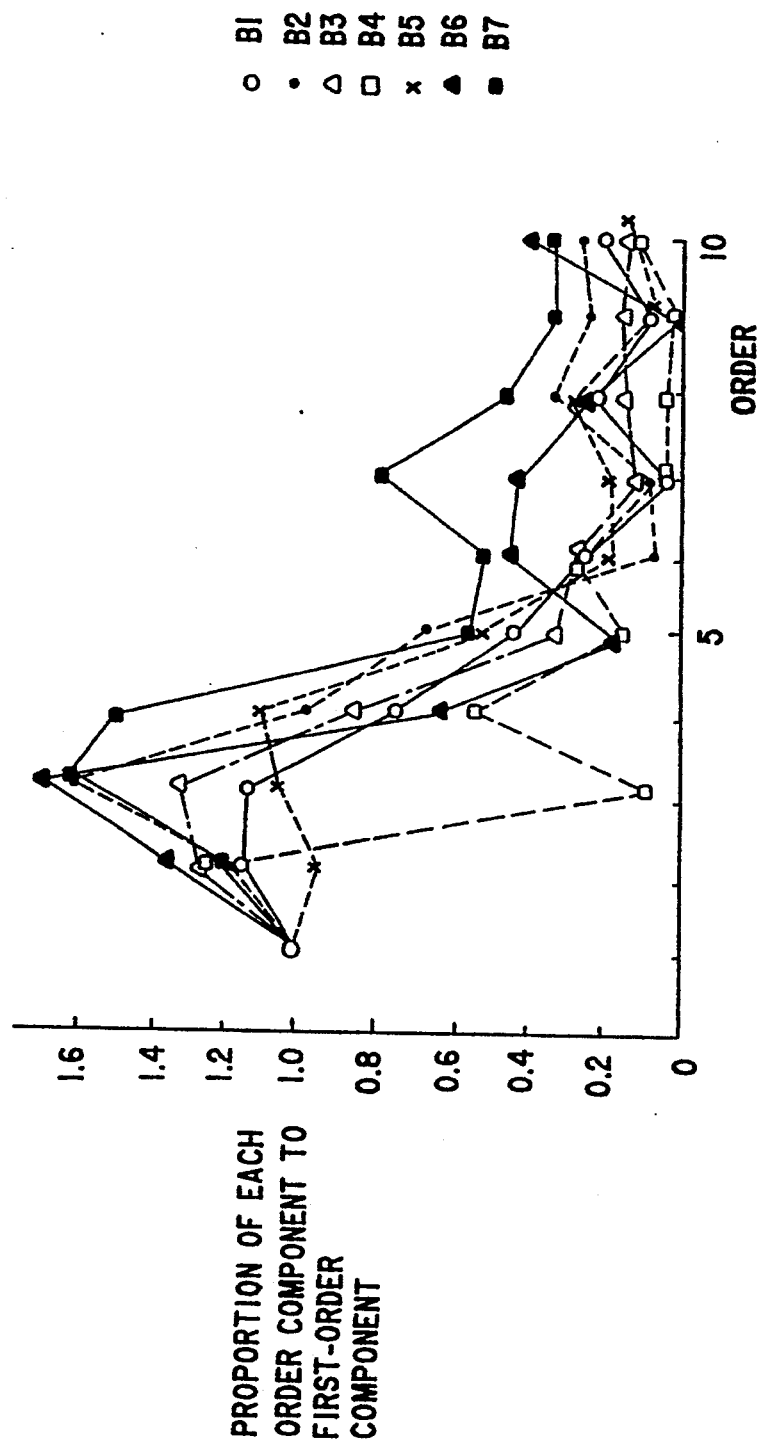
FIG. 9 is a graph showing the relationship between the order of an arrangement within a period with respect to the present invention and the ratio of said order relative to the first order component.
Figure 10A:
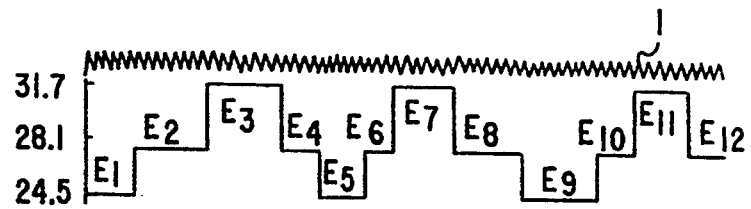
FIG. 10(*a*) and FIG. 11(*a*) are each an explanatory view of a pitch arrangement.
Figure 10B:
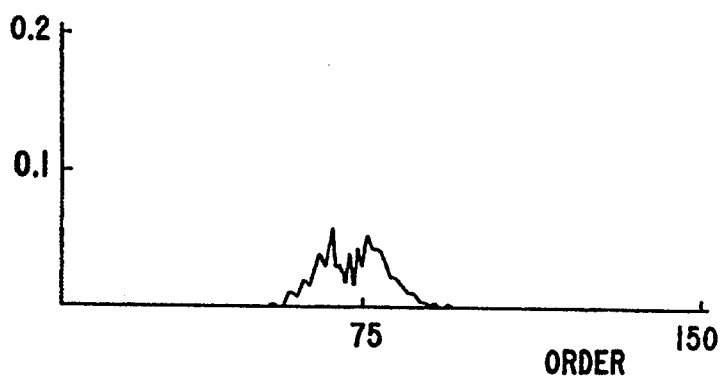
Figure 11A:
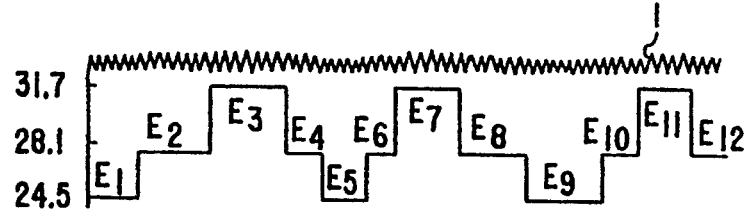
Figure 11B:
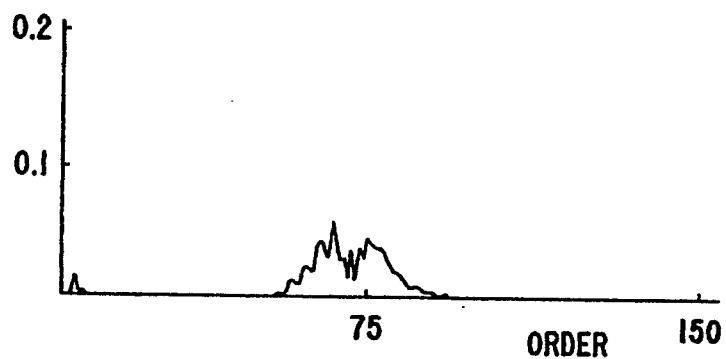

FIG. 9 is a graph showing the relationship between the order of an arrangement within a period with respect to the tire of the present invention and the comparative tire and the proportion of a component of said order relative to the first-order component. In FIG. 9, B1, B2, B3, B5, B6, and B7 each represents a period. In all of the periods B2, B3, B5, and B7, the second and higher order components account for 80 to 200% of the first-order. Further, in this case, the proportion of the second and higher order components is much higher than that in the above-described P1 to P4 period. The kinds of tread design element are represented by A, B, C, D, and E, and each length of pitches of the element is A=40 mm, B=36 mm, C=33 mm, D=29 mm, and E=26 mm.

B1: E E C A A B C D C B B C D D B D
B2: E E E C A A A B B C C D D C C B B B C C D D D D B B D D
B3: E E E C A A A B C D C C B B C D D B B D
B4: E E C A A B B C D C B B C D D D
B5: E E E C A A A A A B B B C C D C C C B B B C C D D D D B B B D D
B6: E E E E C A A A B C C D D D C C C B B B B C C D D D D B B D D D
B7: E E A C A B C D C B C D D B B D;

The whole circumference of the comparative tire 1: B1+B1+B1+B1.

The whole circumference of tire 1 of the present invention: B2+B3+B4.

The whole circumference of the comparative tire 2: B5+B6.

The whole circumference of tire 2 of the present invention: B2+B3+B7.

TABLE 1

| | Number of Periods | Longest Period | Second Period | Third Period | Shortest Period | Noise Pulsation Width (dB) | Remarks on Results of Noise Feeling Tests |
|---|---|---|---|---|---|---|---|
| Conventional Tire 1 | 4 | (0.25: ¼) [P1] {the first order only} | (0.25: ¼) [P1] {the first order only} | (0.25: ¼) [P1] {the first order only} | (0.25: ¼) [P1] {the first order only} | 6.5 | Poor were both pitch noise and noise pulsation under normal running condition. Tire cannot stand practical use. |
| Conventional Tire 2 | 4 | (0.406: ½) [P2] {the first order only} | (0.25: ¼) [P1] {the first order only} | (0.203: 1/5) [P3] {the first order only} | (0.141: 1/7) [P4] {the first order only} | 6.2 | Although it was appreciably improved, noise pulsation was clearly felt, and pitch noise was not improved under normal running condition. Tire cannot stand practical use. |
| Comparative Tire 1 | 4 | (0.25: ¼) [B1] {2, 3} | (0.25: ¼) [B1] {2, 3} | (0.25: ¼) [B1] {2, 3} | (0.25: ¼) [B1] {2, 3} | 4.9 4.9 | Pitch noise was appreciably improved and noise pulsation was fairly improved under normal running condition. |
| Tire 1 of the Present Invention | 3 | (0.436: ½) [B2] {2, 3, 4} | (0.314: ½) [B3] {2, 3, 4} | — | (0.25: ¼) [B4] {2} | 4.1 | Improved were both noise pitch and noise pulsation under both normal running condition and low-speed running condition. Tire is useful practically. |
| Comparative tire 2 | 2 | (0.510: ½) [B5] {2, 3, 4} | — | — | (0.490: ½) [B6] {1, 2, 3} | 3.7 | Improved was pitch noise under normal running condition. |

TABLE 1-continued

| | Number of Periods | Longest Period | Second Period | Third Period | Shortest Period | Noise Pulsation Width (dB) | Remarks on Results of Noise Feeling Tests |
|---|---|---|---|---|---|---|---|
| Tire 2 of the Present Invention | 3 | (0.436: ½) [B2] {2, 3, 4} | (0.314: ½) [B3] {2, 3, 4} | — | (0.25: ½) [B7] {2, 3, 4} | 3.5 | Remarkably improved were both pitch noise and noise pulsation under both normal running condition and low-speed running condition. Tire is useful, desirably. |

: under normal running condition (50 km/hr)

In the comparative tire 1, the B1 arrangement in which the fourth-order components are less than 80% of the first-order components is used, so that this tire has a desirable feeling of noise pulsation under the normal running condition (the tire is run at a speed of 50 km/hr), but it still involves a room for improvement with respect to the feeling of noise pulsation under the low-speed running condition (the tire is run at a speed of 30 km/hr).

In the tire 1 of the present invention, the arrangements B2 and B3 in which the second-order components to the fourth-order components are altogether within a range of 80 to 200% of the first-order components occupy 75% of the arrangements in a full circumference of the tire (0.436+0.314=0.75), so that this tire exceeds the comparative tire 1 with respect to the noise pulsation width and also the feeling of noise pulsation under the normal running condition, and in addition, its feeling of noise pulsation under the low running condition is improved to a satisfactory level.

In the comparative tire 2, the arrangement B5 in which the second-order components to the fourth-order components altogether are within a range of 80 to 200% of the first-order components occupies only 51% of the arrangements in a full tire circumference, so that although this tire has a satisfactory level of the feeling of the noise pulsation under the normal running condition, the improvement attained of this tire with respect to the feeling of the noise pulsation under the low-speed running condition is not satisfactory.

In connection with the tire 2 of the present invention, a full tire circumference is composed of arrangements B2, B3 and B7 in which the second-order components to the fourth-order components altogether are within a range of 80 to 200% of the first-order components, so that this tire has an exceeding feeling of the noise pulsation under each of the normal running condition and the low-speed running condition over the above considered other tires.

As described above, according to the present invention, the incorporation of the second-order component to the fourth-order component in the fundamental period brings about an improvement in the reduction in pulsation of the noise of a low order and enables a reduction in the number of periods of the whole tire, which makes it possible to exhibit an effect of dispersing the pitch noise so that it becomes possible to reduce the pitch noise. The present invention is suitable particularly as a pneumatic tire for a passenger car.

What is claimed is:

1. A pneumatic tire having a tread surface comprised of a plurality of tread design elements having different pitch lengths arranged to extend around the circumference of the tread surface, at least one series of said tread design elements defining a fundamental period, each said series beginning with a first appearing element having a pitch of the shortest pitch length $P_{min}$ and including at least one element having a pitch of the longest pitch length $P_{max}$ between said element having the pitch of $P_{min}$ and a second appearing element having a pitch of $P_{min}$ in a next period, each said fundamental period beginning with said pitch of $P_{min}$ and ending with a pitch located immediately before said pitch of $P_{min}$ located first in the next period, wherein (1) each said fundamental period is a pitch arrangement such that when Fourier expansion of a stepped waveform formed by pitch lengths as abscissas and reciprocals of the pitch lengths as ordinates is conducted, the proportion of components of each higher order in the range of a second order to a fourth order relative to the first-order component is 80 to 200%, (2) the number of said fundamental periods is 1 to 4, (3) the length of said pitch arrangement(s) of all of said fundamental periods of said tire is 60% or more of the total circumferential length of the tire, and (4) the length of each said fundamental period is at least 1/7 of the total circumferential length of the tire.

2. A pneumatic tire having a tread surface as defined by claim 1, wherein the number of kinds of tread design elements within said fundamental period is 3 to 8.

3. A pneumatic tire having a tread surface as defined by claim 1, wherein the ratio of the length of different tread design elements within said fundamental period to the length of a tread design element adjacent thereto is 1.02 to 1.45.

4. A pneumatic passenger car tire having a tread surface comprised of a plurality of tread design elements having different pitch lengths arranged to extend around the circumference of the tread surface, at least one series of said tread design elements defining a fundamental period, each said series beginning with a first appearing element having a pitch of the shortest pitch length $P_{min}$ and including at least one element having a pitch of the longest pitch length $P_{max}$ between said element having the pitch of $P_{min}$ and a second appearing element having a pitch of $P_{min}$ in a next period, each said fundamental period beginning with said pitch of $P_{min}$ and ending with a pitch located immediately before said pitch of $P_{min}$ located first in the next period, wherein (1) each said fundamental period is a pitch arrangement such that when Fourier expansion of a stepped waveform formed by pitch lengths as abscissas and reciprocals of the pitch lengths as ordinates is conducted, the proportion of components of each higher order in the range of a second order to a fourth order relative to the first-order component is 80 to 200%, (2) the number of said fundamental periods is 1 to 4, (3) the length of said pitch arrangement(s) of all of said fundamental periods of said tire is 60% or more of the total circumferential length of the tire, and (4) the length of each said fundamental period is at least 1/7 of the total circumferential length of the tire.

5. A pneumatic passenger car tire having a tread surface as defined by claim 4, wherein the number of kinds of tread design elements within said fundamental period is 3 to 8.

6. A pneumatic passenger car tire having a tread surface as defined by claim 4, wherein the ratio of the length of different tread design elements within said fundamental period to the length of a tread design element adjacent thereto is 1.02 to 1.45.

* * * * *